Patented Feb. 1, 1938

2,107,058

UNITED STATES PATENT OFFICE 2,107,058

PROCESS FOR MAKING AN INSECTICIDE

Louis N. Markwood, Washington, D. C., dedicated to the free use of the People of the United States of America No Drawing. Refiled for abandoned application Serial No. 744,636, September 19, 1934. This application June 24, 1937, Serial No. 150,165

1 Claim. (Cl. 167—34)

(Granted under the act of March 3, 1883, as amended April 30, 1928; 370 O. G. 757)

This application is a refile of my abandoned application, Serial No. 744,636, filed on September 19, 1934.

This application is made under the act approved March 3, 1883, as amended by the act of April 30, 1928, and the invention herein described and claimed may be manufactured and used by or for the Government of the United States for governmental purposes without the payment to me of any royalty thereon.

I hereby dedicate the invention herein described to the free use of the People of the United States of America to take effect on the granting of a patent to me.

My invention relates to a nicotine insecticide in solid and substantially water-insoluble form.

Nicotine as such or in the form of water-soluble compounds has been known and used for many years as an insecticide. The object of this invention is to make a nicotine insecticide wherein the nicotine, suitable combined with other bodies, is held or fixed in substantially water-insoluble form. By insoluble form is here meant of such a low degree of solubility that the nicotine is retained on sprayed surfaces of fruits, vegetables and vegetation over a long period of time under the usual conditions of moisture and temperature.

Nicotine insecticides in water-soluble form suffer from the disadvantage, first, that they do not remain permanently on sprayed surfaces—either running off during application or being washed off by rain water,—and secondly, that their use is limited to soft-bodied (sucking) insects which are killed only by external contact with the soluble form of nicotine.

One advantage possessed by the product here disclosed is that, being insoluble, it is not washed off by rain water and so is effective over long periods of time. Another advantage is that it is effective against a large and economically important group of insects known as chewing insects which can be killed or controlled only as they consume internally the poisonous matter.

Still another advantage is that the product here disclosed provides a satisfactory substitute for insecticides containing arsenic, fluorine and metallic compounds, the use of which is generally regarded as fraught with danger to the public health.

I have found that nicotine when reacted with peat yields a product in which the nicotine is retained in substantially water-insoluble form.

Peat is partially decomposed vegetable organic matter containing a complex mixture of carbonaceous compounds as well as some inert matter in the form of sand and other earthy constituents. It is usually mildly acid. It is widely and abundantly distributed throughout the United States and is available at a very low price. Present uses of peat consume only a fraction of the known supply and any new uses would be welcomed by agricultural industry.

The reaction product of nicotine and peat can be applied as a fine dust to the vegetation desired to be protected, or it can be suspended in water, with or without addition of other substances, and applied as a spray in a dosage dependent upon the nicotine content.

In making the nicotine-peat product I may proceed as follows: To an aqueous solution of nicotine in the free state I add a quantity of ground peat so as to make a thin suspension. After shaking well and preferably with continuous agitation I allow the mixture to stand up to 2 hours at ordinary or elevated temperature. Then I separate the solid material from the aqueous liquid by known means such as filtration and wash the solid cake well with water until the liquid is neutral to an indicator such as phenolphthalein and contains only a minor quantity of soluble nicotine, as shown by a slight opalescence with silicotungstic acid. Then the material is ready for use in spray form, or it may be dried under mild heat and be stored, transported or used in the dry state. Any unused nicotine which is found in the liquid portion may be recovered by known means and used again.

The above procedure is a general one and is capable of wide variations in its several features. Usually I take the following proportions: ½ gm. of nicotine, 25 cc. of water, and 1 gm. of peat. These proportions provide a convenient manipulation. However, I may take as little as $\frac{1}{10}$ gm. of nicotine or as much as 10 gms., from 10 cc. of water to 100 cc., from $\frac{1}{10}$ gm. of peat to 15 gms. As long as nicotine and peat are present in any quantity there is combination resulting in an insoluble nicotine-peat product of the nature disclosed.

The reaction is usually conducted on a steam bath at a temperature of approximately 100° C. as it was found that the amount of nicotine combined is greater under that condition than is the case at lower temperatures. However, the reaction proceeds at temperatures down to the freezing point of the liquid. It also proceeds at temperatures up to 200° C., under pressure, but again the yield is lower.

The time allowed for reaction is generally 2 hours, but the same results are achieved in as little as 15 minutes.

I may also proceed as follows: Into a mass of air-dry peat suitably contained I pass the vapor of nicotine or a mixture of the vapors of nicotine and of water. Or I pass the vapor of nicotine or a mixture of the vapors of nicotine and of water into a suspension of peat and water.

It is found that 1 gm. of a given peat combines with a more or less constant quantity of nicotine. Thus, under the usual conditions outlined above— viz., ½ gm. of nicotine, 25 cc. of water, and 1 gm. of peat, on the steam bath for 2 hours—the percentage of nicotine in the well washed product was, in the case of a Florida peat, 4.7. In the case of a Michigan peat the percentage was 8.2. Recognition is made of the fact that peats of different vegetable origin or derived from different localities vary in combining power.

I have found further that when peat is given a preliminary treatment with acids before the reaction with nicotine the percentage of the latter combined in the peat is greater than when the peat is not so treated. Thus, the Florida peat which when untreated, contains 4.7% of nicotine contains 8.5% of nicotine when previously treated with 2% HCl: 8.2% of nicotine when previously treated with 3% $H_2SO_4$: 8.4% of nicotine when previously treated with 3% $HNO_3$: and 6.9% of nicotine when previously treated with 3% acetic acid. In all cases where peat is given a preliminary treatment it is washed well to remove excess acid and dissolved matter as otherwise the percentage of combined nicotine is lowered. Thus, in the presence of 0.2 cc. of acetic acid in a volume of 25 cc. of a 2% nicotine solution the percentage of nicotine combined with 1 gram of Florida peat is reduced to 3.7, from 4.7; in the presence of 0.5 cc. of acetic acid it is further reduced to 2.2.

It will be recognized that nicotine in the presence of acetic acid is equivalent to an aqueous solution of a nicotine salt, viz., the acetate. Nicotine hydrochloride, formed from nicotine and hydrochloric acid, also reacts with peat. Thus, in the presence of 6 cc. of N—HCl in a solution of 25 cc. of a 2% nicotine solution the percentage of nicotine combined with 1 gram of Florida peat is 2.7. It is apparent that while nicotine salts react with peat the extent of combination is not as great as with free nicotine.

I have found also that when peat is given a preliminary treatment with a fixed alkali before the reaction with nicotine the percentage of the latter combined in the peat is greater than when the peat is not so treated. Thus, the Florida peat after previous treatment with a 5% NaOH solution followed by thorough washing, first with water and then with very dilute acid, contains 9.5% of nicotine.

Peat that has been treated with ammonia (so-called "ammoniated" peat) also reacts with nicotine. Thus, an ammoniated peat containing 11.8% of nitrogen held 2.6% of nicotine.

Having thus described my invention, what I claim for Letters Patent is:

In a process for preparing nicotine-peat reaction products, the steps which comprise treating peat with an acid from the group consisting of mineral acids and acetic acid, washing said peat to remove soluble matter, bringing together in intimate contact an aqueous solution of nicotine and said peat, allowing the mixture to react, and recovering the water-insoluble portion.

LOUIS N. MARKWOOD.